United States Patent
Gajulu Narasimhalu et al.

(10) Patent No.: US 10,997,357 B2
(45) Date of Patent: May 4, 2021

(54) USER INTERFACE NAVIGATION MANAGEMENT

(71) Applicant: International Business Machines Corporation, Armonk, NY (US)

(72) Inventors: Karunakaran Gajulu Narasimhalu, Chintamani (IN); Debasish Panda, Sambalpur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/447,524

(22) Filed: Jun. 20, 2019

(65) Prior Publication Data

US 2020/0401656 A1 Dec. 24, 2020

(51) Int. Cl.
*G06F 17/00* (2019.01)
*G06F 40/134* (2020.01)
*G06F 9/451* (2018.01)
*G06F 16/954* (2019.01)
*G06F 16/955* (2019.01)

(52) U.S. Cl.
CPC ............ *G06F 40/134* (2020.01); *G06F 9/451* (2018.02); *G06F 16/954* (2019.01); *G06F 16/9558* (2019.01)

(58) Field of Classification Search
CPC .... G06F 16/958; G06F 16/951; G06F 16/954; G06F 16/957; G06F 40/14
See application file for complete search history.

(56) References Cited

U.S. PATENT DOCUMENTS

| | | | |
|---|---|---|---|
| 6,738,950 B1* | 5/2004 | Barnett | G06F 16/958 715/205 |
| 7,035,864 B1 | 4/2006 | Ferrari | |
| 8,140,579 B2 | 3/2012 | Li | |
| 8,438,487 B1 | 5/2013 | Lin-Hendel | |
| 2004/0027391 A1 | 2/2004 | Tu | |
| 2004/0133897 A1* | 7/2004 | Covely, III | G06F 11/3072 719/328 |
| 2005/0172262 A1 | 8/2005 | Lalwani | |
| 2005/0198377 A1* | 9/2005 | Ferguson | G06Q 20/102 709/238 |
| 2007/0124506 A1 | 5/2007 | Brown | |
| 2009/0094199 A1 | 4/2009 | Hawkins | |
| 2010/0332325 A1* | 12/2010 | Holte | G06F 16/954 705/14.54 |
| 2011/0035486 A1* | 2/2011 | Seolas | G06F 11/3692 709/224 |
| 2014/0372866 A1* | 12/2014 | Tidhar | G06F 40/14 715/234 |
| 2018/0341714 A1 | 11/2018 | Akolkar | |

FOREIGN PATENT DOCUMENTS

EP 1503305 A2 5/2006

* cited by examiner

*Primary Examiner* — Scott T Baderman
*Assistant Examiner* — Barbara M Level
(74) *Attorney, Agent, or Firm* — Brian D. Welle (57) ABSTRACT

Application data that includes a plurality of pages of the application is received. Input parameters for each page of the plurality of pages is determined using the application data. A set of pages of the plurality of pages is determined for which all respective input parameters are identified. A set of hyperlinks for the set of pages is generated.

20 Claims, 5 Drawing Sheets

USER INTERFACE NAVIGATION MANAGEMENT

BACKGROUND

The present disclosure relates to managing navigation within user interfaces (UIs). UIs may include graphical text features and icons and the like that are displayed for a user when the user accesses a program, such as a locally stored program or a remotely stored program accessed as a website or the like. A program may include a plurality of pages that each include different portions of the application. Pages of an application may be organized according to an organizational hierarchy, where one or more "main" pages link to subpages which can be further tunneled into access pages that relate to specific sub-functionalities of the application. In some cases, some complex pages may require one or more data points from a user as inputted by the user at a previous screen to load the relatively complex pages. For example, the user may have to provide a number of user selections at an input page in order to access a page related to metrics of those user selections. In certain examples, a series of pages may each require distinct sets of input parameters that build upon each other, such that pages of a UI may effectively tunnel into a program to provide increasing specialized utility for a user as the application gathers additional information from the user.

SUMMARY

Aspects of the present disclosure relate to a method, system, and computer program product relating to user interface navigation management. For example, aspects of the disclosure relate to a processor receives receiving application data of an application being utilized by a user. The application data includes a plurality of pages of the application. The processor determines, using the application data, input parameters for each page of the plurality of pages. The processor determines a set of pages of the plurality of pages for which all respective input parameters are identified. The processor generates a set of hyperlinks for the set of pages.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to user interface navigation, and more particular aspects relate to providing functionality for user interface navigation management such as single-click navigation to most or all pages of an application. While the present disclosure is not necessarily limited to such applications, various aspects of the disclosure may be appreciated through a discussion of various examples using this context.

Modern computer usage often revolves around using third-party software applications to execute tasks. For example, a user may use a computing device (e.g., a laptop or desktop computer or a phone or the like) to access a software application (hereinafter referred to as an application, or an app) to enter data and analyze data through one or more user interfaces (UIs) of the application. The application may be downloaded locally to the computing device, accessed remotely by the computing device from a hosting server that is hosting the application, or some combination of the two. Once accessed, a user may utilize the application using the UI of the application.

Often, applications may include a UI that is configured to present a plurality of pages as the user navigates throughout the UI. As used herein, pages may include discrete portions of the application that may each relate to distinct features of the application, such that each page of the application may present unique information, or be used to enter unique information, or the like. In some examples, each page may be configured to be rendered individually (e.g., such that a graphics processing unit of the computing devices that is rendering the UI of the application renders each page individually in response to a command related to that page), and/or pages may logically flow from and/or to each other within the application. For example, a user may log in to the application on a login page, after which the user may review a plurality of options on a main page of the application, after which the user may enter one or more variables into respective entry fields of the main page and then select a single feature of the main page to view a specialty page related to that feature. In this way, a user may navigate through a plurality of pages that may tunnel into each other, such that there is a predetermined sequence as defined by the application in order to access some or all of these pages.

In some examples, such a predetermined sequence may be configured to ensure that all information and/or authentication that is needed for a page to load is provided prior to requesting access to that page. For example, a user may authenticate their identity by providing a username and password or the like at the login page as described above, such that after a recognized username/password combination is provided the application loads the main page. Further, the user may enter a parameter or two related to a feature into entry fields of a main page as described above so that the application may properly populate and/or generate data of a specialized page related to that feature.

Depending upon the application, it may be relatively complex and/or require a plurality of navigation operations to get between pages of the application. For example, an application may include a relatively large number of pages (e.g., a few dozen or a few hundred pages or more) that may tunnel into each other, such that an application may require to select a series of pages in a predetermined order to get to a certain desired page using the UI of the application. In such examples, it may require a relatively high number of navigation operations (e.g., a user clicking to return to a previous higher-level page two times, and therein tunneling into specific dependent pages through clicking on hyperlinks three or four times). Further, where there are numerous different tunneling options (e.g., where one page includes hyperlinks to a plurality of dependent pages, some of which themselves may include hyperlinks to a plurality of dependent pages), it may be difficult for a user to remember how to navigate to a certain desired page.

Aspects of this disclosure improve and/or eliminate these issues by generating a list of hyperlinks of many, most, or all pages of an application that a user may navigate to, such that a user may access each of these pages through a single click from this list to the respective page. This may be achieved with a plugin that is configured to add this functionality to many and/or all standalone applications (e.g., such that the plugin is itself configured to be plugged into most or all applications). The plugin may determine a set of pages for which sufficient data has been gathered such that the application may generate and display those pages. Once determined, the plugin may list and provide a link to each page of that set of pages. In some examples, the plugin may also note any "indeterminate" pages for which the application has insufficient data to generate, and/or provide a link to one or more pages that must be completed/filled out such that the application may acquire sufficient data to generate these (previously indeterminate) pages.

Figure 1:
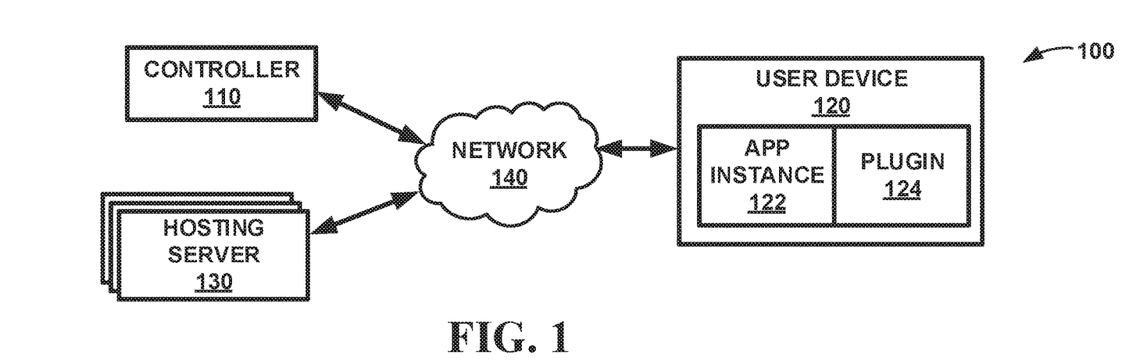
FIG. 1 depicts a conceptual diagram of an example system in which a controller utilizes a plugin to manage navigation of an app instance hosted by a hosting server and accessed on a user device.

For example, FIG. 1 depicts system 100 that includes controller 110 that is configured to provide single-click navigation. Controller 110 may include a computing device, such as computing device 250 of FIG. 4 that includes processor 270 communicatively coupled to memory 280 that includes instructions 288 that, when executed by processor 270, cause controller 110 to execute the operations described below. Controller 110 may be configured to provide single-click navigation to a user using user device 120. User device 120 may be a computing device (similar to computing device 250 of FIG. 4 as described below) such as a laptop, desktop computer, mobile phone, or the like. User device 120 may include a processor communicatively coupled to a memory, as described herein. User device 120 may include a display such as a screen or the like that is configured to visually generate images, such as images of a user interface (UI).

Though for the purposes of clarity controller 110 is described as a single entity in a single location that provides UI navigation management, in some examples some functionality of UI navigation management may be split between controller 110 and plugin 124. For example, controller 110 may download and/or configure plugin 124 on user device 120, after which a second processor of user device 120 may execute other functionality of UI navigation management (e.g., provide a list of navigable pages) as a result of downloaded plugin 124. In other examples UI navigation management functionality may be divided in a different manner, and/or a single processor and/or a single set of instructions stored on memory of a single computing device may provide all UI navigation management functionality described herein.

User device 120 may access an application hosted by hosting server 130. Hosting server 130 may be a computing device such as a laptop, a desktop, a server, a rack of servers, or the like. User device 120 may access hosting server 130 over network 140. Network 140 may include a computing network over which computing messages may be sent and/or received. For example, network 140 may include the Internet, a local area network (LAN), a wide area network (WAN), a wireless network, or the like. Network 140 may comprise copper transmission cables, optical transmission fibers, wireless transmission, routers, firewalls, switches, gateway computers and/or edge servers. A network adapter card or network interface in each computing/processing device (e.g., controller 110, user device 120, and hosting server 130) may receive messages and/or instructions from and/or through network 140 and forwards the messages and/or instructions for storage or execution or the like to a respective memory or processor of the respective computing/processing device.

The user may access an application hosted by hosting server 130 as a local app instance 122 on user device 120. For example, the user may download a local instance of the application hosted by hosting server 130, and/or the user may access a webpage over network 140 that provides a portal to the application hosted by hosting server 130. The application as provided by hosting server 130 may include a plurality of pages. Pages, as used herein, may include discrete portions of the application that may be individually accessed (and therein rendered by user device 120) by a user. For example, each page of the application may be configured to be individually rendered, and/or each page may include unique input parameters that can and/or must be provided to app instance 122 to properly generate the respective pages, and/or each page may be accessed through a respective application program interface (API). Further, some of the pages of the application may tunnel into other pages of the application, such that the only manner or the primary manner to navigate to a page of the application as provided by the original coding of the application may require the user to click on specific links or icons of the application UI as provided on predetermined pages in a predetermined order.

Figure 2A:
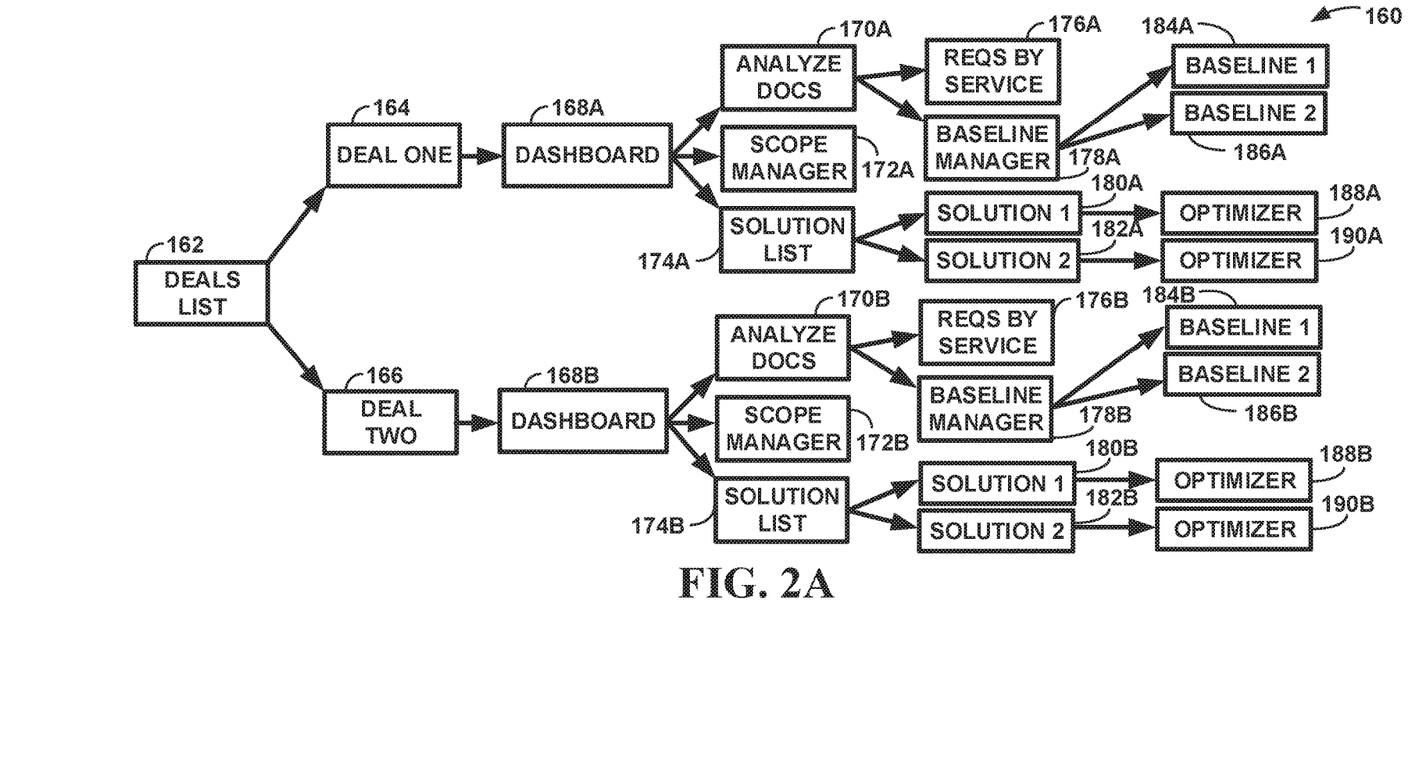
FIG. 2A depicts an example hierarchy of a plurality of pages of the app instance of FIG. 1 that may be accessible to the user using the user device of FIG. 1.

For example, FIG. 2A provides an example hierarchy 160 of example pages of an application that may be hosted by hosting server 130. As depicted in FIG. 2A, deals list page 162 links to deal one page 164 and deal two page 166, such that you would "tunnel" into deals list page 162 to get to either deal one page 164 and deal two page 166. Both deal one page 164 and deal two page 166 have a respective dashboard 168A, 168B that provides navigation options (e.g., hyperlinks or the like) to respective analyze docs pages 170A, 170B, scope manger pages 172A, 172B, and solution lists pages 174A, 174B. Analyze docs pages 170A, 170B further provide navigation options to respective requirements (reqs) by service pages 176A, 176B and baseline manager pages 178A, 178B, which themselves provide navigations options to baseline one pages 184A, 184B and baseline two pages 186A, 186B. Further, as depicted, hierarchy 160 includes a navigation option from respective solution list pages 174A, 174B to solution one pages 180A, 180B and solution two pages 182A, 182B, which each provide respective navigation options to respective optimizer pages 188A, 188B, 190A, 190B. As used herein, all of these pages collectively may be referred to as "pages 162-190."

Some of pages 162-190 may require substantially no input parameters, such that merely submitting a request (e.g., submitting an http request) without providing further information may be sufficient to access the respective requested page. For example, if dashboard page 168A required no input parameters, clicking on a hyperlink to dashboard page 168A from deal one page 164 may be sufficient to access dashboard page 168A. In this way, controller 110 may determine that each of pages 162-174 requires no input parameters, such that each is fully parameterized. For example, deal one page 164 may pull in details from a first business deal that is fully quantified by another database that is accessible to the application of hierarchy 160, such the application needs no other information to bring up deal one page 164 that provides some details on the first business deal. In other examples, more or less of pages 162-190 may require substantially no input parameters.

Alternatively, or additionally, some of pages 162-190 may require one or more input parameters that the application requires to be provided prior to loading the respective requested page. For example, the application may specify that loading solution one page 180A requires some input parameters (e.g., as entered on solution list 174A) that, e.g., define a first solution. In such examples, an API uniform resource location (URL) to solution one page 180A from solution list 174A may define or list some or all input parameters that the application requires to properly load solution page 180A.

Within this predetermined hierarchy, the application may require a relatively high number of clicks to move between pages 162-190 using conventional systems. For example, it may require eight navigation operations to move between baseline one page 184A to analyze docs page 168B (e.g., back to baseline manager page 178A, back to analyze docs page 170A, back to dashboard page 168A, back to deal one page 164, and back to deals list 162, after which the user may tunnel into deal two page 166, then into dashboard page 168B, before finally getting to analyze docs page 170B). It may be a drain on the time and efforts of the user to require such a complicated set of navigation operations to navigate between pages, particularly if the user does not immediately remember this predetermined singular path.

As discussed herein, aspects of the disclosure are related to providing single-click navigation to a user. For example, controller 110 and plugin 124 may communicate with user device 120 and/or hosting server 130 over network 140 to provide single-click navigation. Controller 110 may provide single-click navigation with a remote computing agent of controller 110 such as plugin 124. Plugin 124 may include a software component that interacts with app instance 122 to provide additional single-click navigation functionality to a user using the app as an app instance 122 on user device 120. Further, controller 110 and plugin 124 may be configured to provide this functionality to substantially any application.

Controller 110 and/or plugin 124 may prepare a configuration file for plugin 124 to be integrated with app instance 122 on user device 120 (though, as described above, controller 110 is described as providing such functionality as described below for the sake of readability). For example, in some instances a configuration file may include code such as:

```
[urls:{[
{id: 1, URL: app.manage-RFP, params: "deal ID"}
{id: 2, URL: app.opportunity-review-documents, params: " deal ID,doc Id"},
{id: 3, URL: app.baselines-manager, params: " deal ID, base Id"},
{id: 4, URL: app.deal-list, params: " deal ID "}
]}]
```

In this example configuration file, "id" may represent a unique identifier for each json object, and URL may indicate the link to be utilized to access the page in the application, and "params" may indicate a comma separated list of parameters required to route to the page.

The configuration file may be configured to "fetch" or otherwise identify each accessible "node" or page of the application. Controller 110 may identify each page of the application using any number of techniques. For example, controller 110 may request access to source code of the application. With this source code, controller 110 may be configured to identify each page of the application, as well as identify respective addresses such as API URLs for each page. Alternatively, controller 110 may send a request to hosting server 130 for a list of pages, or controller 110 may access other publicly available information that detail a list of pages. Once pages are identified and respective locations are determined, controller 110 may identify input parameters for respective pages.

Controller 110 may identify input parameters using a variety of techniques. For example, controller 110 may utilize a trace command or tool (e.g., such as HTTP Trace, httptrace, TCP/HTTP trace utility, Fiddler Trace) to identify input parameters. Controller 110 may utilize such trace tools to identify hypertext transfer protocol (HTTP) requests that are, e.g., being sent by app instance 122 to hosting server 130 when pages of the application is accessed and/or queried. Input parameters may then be pulled from the trace data retrieved from the trace command. Determining input parameters using trace tools in this way may enable system 100 to provide single-click navigation as described herein without active assistance from developers and/or administrators of hosting server 130.

Alternatively, or additionally, controller 110 may identify input parameters by crawling through the source code. In this example, controller 110 may be configured to identify what input parameters would look for within the source code. Alternatively, or additionally, controller 110 may receive input parameters from host server 130. Controller 110 may be configured to send a request to host server 130 for input parameters, and/or to identify a description of input parameters as stored on host server 130, or the like.

Once input parameters are identified, controller 110 may identify which input parameters have already been entered by the user and/or are otherwise stored on user device 120. Controller 110 may further determine a set of pages that are fully parameterized, either as a result of those pages requiring no input parameters or as a result of those pages requiring input parameters that have already been gathered. This set list of accessible parameterized pages may then be provided to a user using plugin 124. In this way, in examples where controller 110 and/or plugin 124 may store previously used parameters to access substantially all pages of an application, controller 110 may use plugin 124 to, e.g., enable a user to navigate between baseline one page 184A to analyze docs page 170B with one click rather than eight clicks as described above.

In some examples, controller 110 may further provide navigation options to indeterminate pages, which may include pages for which one or more required input parameters are not yet identified by app instance 122. For example, controller 110 may provide a link to a proximate page for the indeterminate page. The proximate page may be a page from which the user may access the indeterminate page, and/or the proximate page may be the page at which the user may provide input parameters to fully parametrize the (currently indeterminate) page.

For example, plugin 124 may indicate to a user that solution one page 180B is indeterminate as some input parameters are not known by plugin 124 and/or app instance 122, such that app instance 122 is unable to generate solution one page 180B (and therein plugin 124 does not provide a link to solution one page 180B). Plugin 124 may further indicate that navigating to solution list page 174B may provide the user with access to entry fields of solution list page 174B that the user may fill in order to provide the input parameters required to fully parametrize solution one page 180B. In this way, system 100 may both provide user interface navigation options both to pages that are fully parametrized as well as pages that are relatively close to indeterminate pages.

Figure 2B:
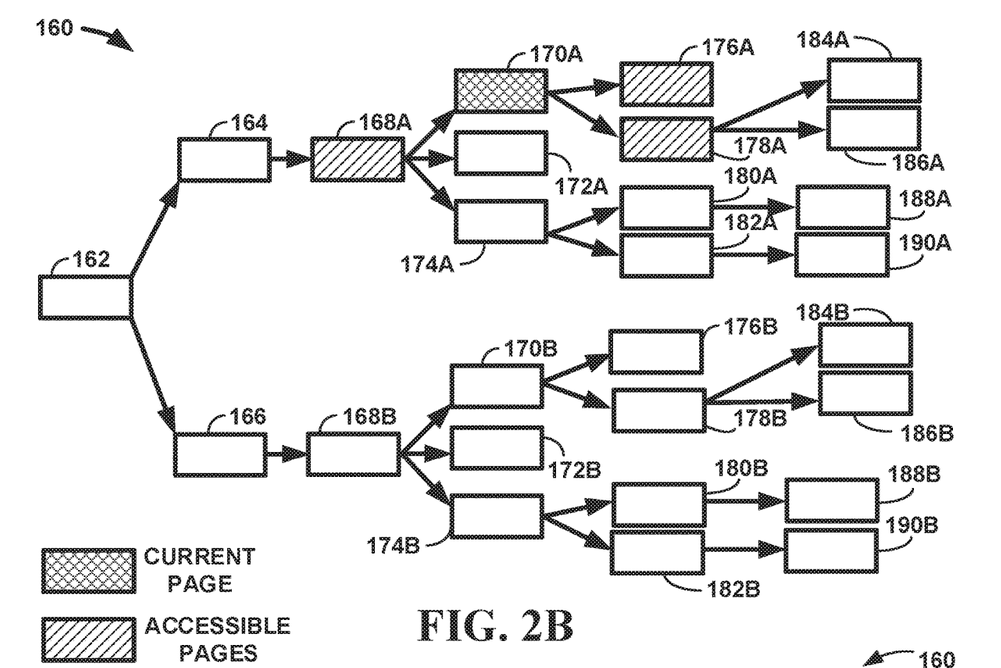
FIG. 2B depicts the example hierarchy of FIG. 2A of the app instance with pages conceptually shaded to depict UI navigation options prior to full plugin configuration.
Figure 2C:
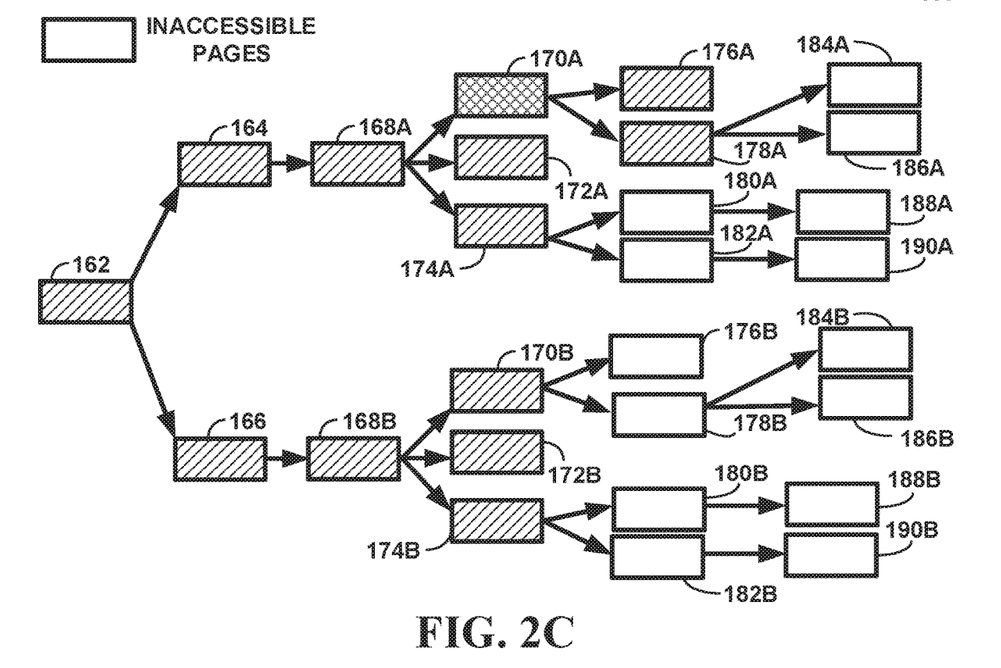
FIG. 2C depicts the example hierarchy of FIG. 2A of the app instance with pages conceptually shaded to depict UI navigation options utilizing plugin following configuration.

For example, FIGS. 2B and 2C depict example hierarchy 160 with shading that depicts current page 170A of a user as well as currently accessible pages using navigation options before and after plugin 124 has been configured, respectively. In both FIGS. 2B and 2C, the user is currently on page 170A. As depicted in FIG. 2B, prior to configuring plugin 124, the accessible pages may include page 160A, page 176A, and page 178A. Put differently, prior to fully configuring plugin 124 by identifying all pages and parameter data, a user accessing app instance 122 on user device 120 may only be able to immediately navigate to three separate pages 160A, 176A, 178A, using navigation options of app instance 122.

FIG. 2C depict hierarchy 160 of pages 162-190 prior to controller 110 and/or plugin 124 collecting input parameter data as discussed herein, so only pages with substantially no input parameters may be accessible in FIG. 2C. Nonetheless, plugin 124 may determine that each of pages 162, 164, 166, and 168B, 172A, 172B, 174A, and 174B are accessible pages. As such, plugin 124 may provide the user with the ability to navigate to any of these accessible pages 162, 164, 166, and 168B, 172A, 172B, 174A, and 174B with a single click as described herein. In this way, as described herein, plugin 124 may increase UI navigability by identifying and presenting a list of pages which the user may navigate to with a single navigation operation (e.g., such as a single click).

Figure 3:
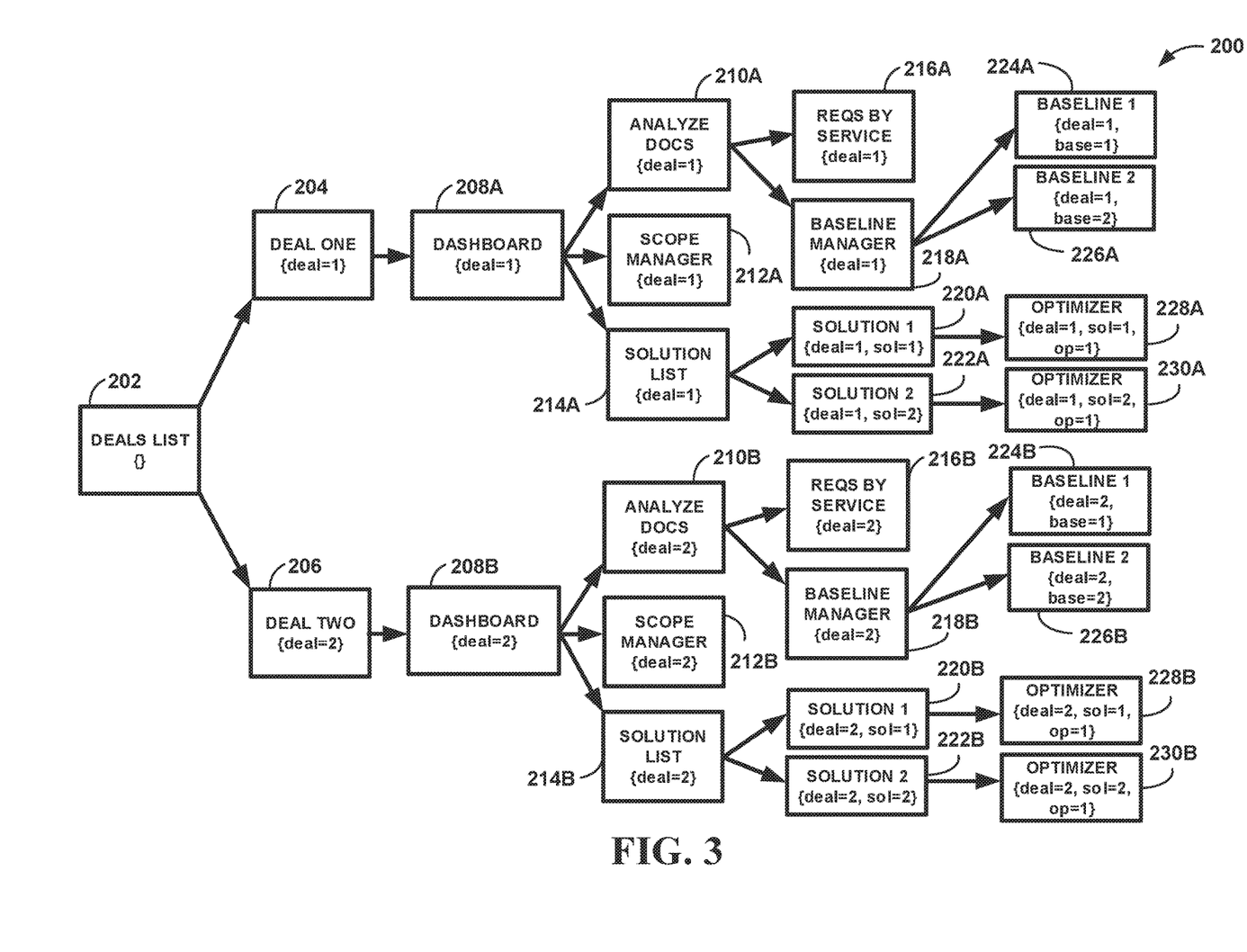
FIG. 3 depicts an example hierarchy of a plurality of pages with example parameters of the app instance of FIG. 1 that may be accessible to the user using the user device of FIG. 1.

In some examples, controller 110 may determine that app instance 122 as accessed by user device 120 and hosted by hosting server 130 may define input parameters on nearly all pages of app instance 122. Further, in some examples of app instance 122, input parameters may become increasingly robust as pages further tunnel into each other. For example, FIG. 3 depicts an example hierarchy 200 of example pages of an application that may be hosted by hosting server 130. For purposes of illustration example hierarchy 200 is depicted to be relatively similar to hierarchy 160 of FIG. 2A, including substantially similar pages of hierarchy 200 and pages 162-190 of hierarchy 160. For example, as depicted in FIG. 3, deals list page 202 links to deal one page 204 and deal two page 206, while both deal one page 204 and deal two page 206 have a respective dashboard pages 208A, 208B that provides navigation options (e.g., hyperlinks or the like) to respective analyze docs pages 210A, 210B, scope manger pages 212A, 212B, and solution lists pages 214A, 214B. Analyze docs pages 210A, 210B further provide navigation options to respective reqs by service pages 216A, 216B and baseline manager pages 218A, 218B, which themselves provide navigations options to baseline one pages 224A, 224B and baseline two pages 226A, 226B. Further, respective solution list pages 174A, 174B include navigation options to solution one pages 220A, 220B and solution two pages 222A, 222B, which each provide respective navigation options to respective optimizer pages 228A, 228B, 230A, 230B. As used herein, all of these pages collectively may be referred to as "pages 202-230."

FIG. 3 depicts parameters of respective pages 202-230 as the values within brackets of respective pages 202-230. For example, deals list page 202 includes no input parameters, while deal one page 204 (and every page that tunnels into deal one page 204) includes one or more input parameters categorized under the title of "deal=1", and deal two page 206 (and every page that tunnels into deal two page 206) includes one or more input parameters categorized under the title of "deal=2". Controller 110 may determine that both input parameters deal=1 and deal=2 may be inputted by a user at deal list page 202, upon which a user may navigate to any page that requires only these input parameters. For example, a user at reqs by service page 216A has already provided deal=1 input parameter(s), such that controller 110 determines that all pages that only have deal=1 input parameter(s) are fully parameterized (e.g., and may therein be freely navigated to using a single navigation operation such as a single click as provided by controller 110).

As a user navigates further into hierarchy 200, controller 110 may identify that other pages 202-230 have additional input parameters. For example, controller 110 may identify that baseline one page 224A further includes input parameter "base=1" and baseline two page 226A includes input parameter "base=2". As such, a user may be prohibited from initially navigating from, e.g., solution list page 214A to baseline one page 224A prior to providing input parameter base=1 (e.g., even though the user has already provided (or controller 110 has already gathered) deal=1 input parameter). However, being as baseline 1 page 224A includes both deal=1 input parameter and base=1 parameter, when on baseline 1 page 224A controller 110 may provide a navigation option to navigate using a single click from baseline 1 page 224A to solution list page 214A.

As depicted, in some examples page 202-230 may simply add up additional input parameters as pages 202-230 tunnel into hierarchy 200. For example, as depicted solution list page 214B may only include input parameters "deal=2", while solution 2 page 222B as tunneled into solution list page 214B includes both input parameters "deal=2" and "sol=2", while optimizer page 230B as tunneled into solution 2 page 222B includes all three input parameters "deal=2" and "sol=2" and "op=2". As such, when a user has navigated to optimizer page 230B (and before controller 110 has stored, gathered, or otherwise gained access to any input parameters than the three input parameters that are required to access optimizer page 230B), controller 110 may provide navigation options to navigate (e.g., with a single click) to any of pages 202-230 that are defined by only one or more of these three input parameters.

Figure 4:
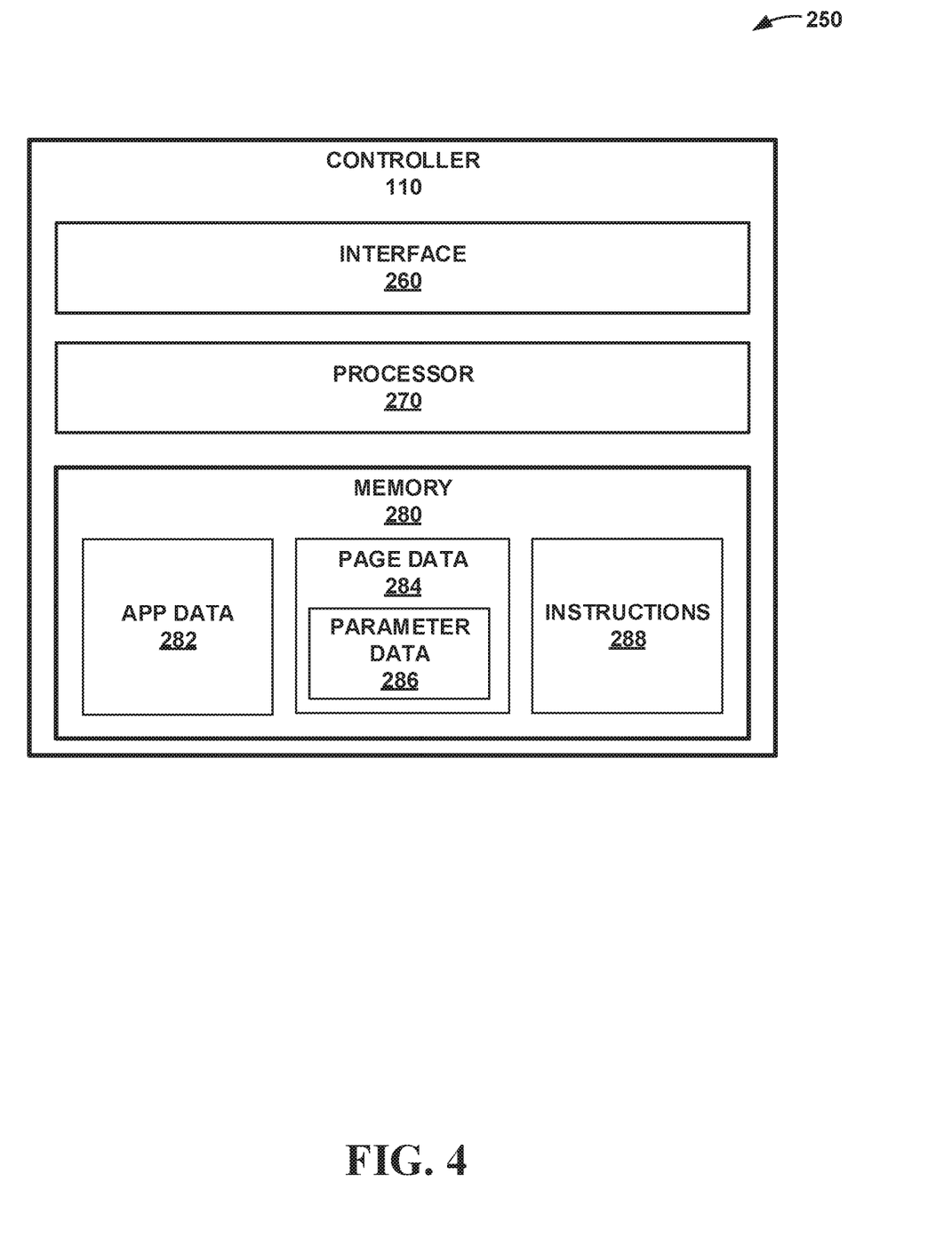
FIG. 4 depicts a conceptual box diagram of a computing system that may be configured to manage user interface navigation.

As described above, controller 110 may include computing system 250 with a processor configured to execute instructions stored on a memory to execute the techniques described herein. For example, FIG. 4 is a conceptual box diagram of such computing system 250 of controller 110.

While controller 110 is depicted as a single entity (e.g., within a single housing) for the purposes of illustration, in other example controller 110 may include two or more discrete physical systems (e.g., within two or more discrete housings). Controller 110 may include interfaces 260, processor 270, and memory 280. Controller 110 may include any number or amount of interface 260, processor 270, and/or memory 280.

Controller 110 may include components that enable controller 110 to communicate with (e.g., send data to and receive and utilize data transmitted by) devices that are external to controller 110. For example, controller 110 may include interface 260 that is configured to enable controller 110 and components within controller 110 (e.g., such as processor 270) to communicate with entities external to controller 110. Specifically, interface 260 may be configured to enable components of controller 110 to communicate with user device 120, host server 130, or the like. Interface 260 may include one or more network interface cards, such as Ethernet cards, and/or any other types of interface devices that can send and receive information. Any suitable number of interfaces may be used to perform the described functions according to particular needs.

As discussed herein, controller 110 may be configured to manage user interface navigation such as described above. Controller 110 may utilize processor 270 to manage user interface navigation. Processor 270 may include, for example, microprocessors, digital signal processors (DSPs), application specific integrated circuits (ASICs), field-programmable gate arrays (FPGAs), and/or equivalent discrete or integrated logic circuit. Two or more of processor 270 may be configured to work together to manage user interface navigation.

Processor 270 may manage UI navigation according to instructions 288 stored on memory 280 of controller 110. Memory 280 may include a computer-readable storage medium or computer-readable storage device. In some examples, memory 280 may include one or more of a short-term memory or a long-term memory. Memory 280 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, processor 270 may manage UI navigation according to instructions 288 of one or more applications (e.g., software applications or software components such as plugin 124) stored in memory 280 of controller 110.

In addition to instructions 288, in some examples gathered or predetermined data or the like as used by processor 270 to manage UI navigation may be stored within memory 280. For example, memory 280 may include app data 282 used to determine the pages of the app. In some examples, memory 280 may further store page data 284 of each page identified using app data 282, and/or parameter data 286 that identifies input parameters of respective pages, and/or stores gathered input parameters. Alternatively, or additionally, app data 282, page data 284, and/or parameter data 286 may be stored within user device 120, where plugin 124 stores instructions 288 and causes a processor of user device 120 (which may be similar to processor 270) to manage UI navigation as described herein.

Figure 5:
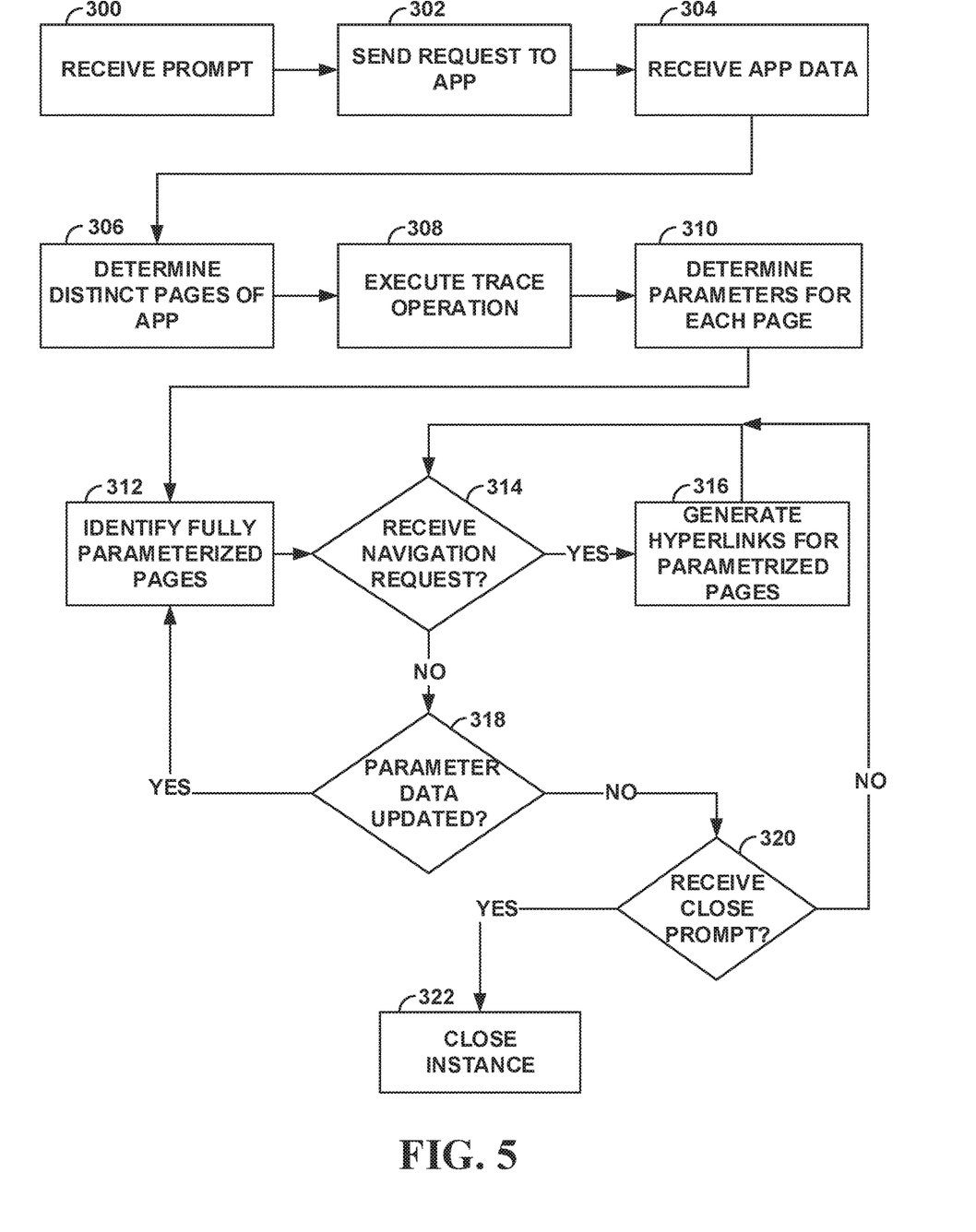
FIG. 5 depicts an example flowchart of managing navigability within a user interface.

Using these components, controller 110 may manage UI navigation as discussed herein. For example, controller 110 may manage UI navigation according to the flowchart depicted in FIG. 5. The flowchart of FIG. 5 is discussed with relation to FIG. 1 for purposes of illustration, though it is to be understood that other systems may be used to execute the flowchart of FIG. 5 in other examples. Further, in some examples system 100 may execute a different method than the flowchart of FIG. 5, or system 100 may execute a similar method with more or less steps in a different order, or the like.

A prompt is received (300). For example, the prompt may include a user downloading plugin 124, or prompt 124 may include the user opening app instance 122 on user device 120. The prompt may cause plugin 124 to initialize or configure plugin 124 for app instance 122 as hosted by host server 130. In some examples, plugin 124 may be configured to be merged with many or substantially any app instance 122 of substantially any application. It is to be understood that the prompt does not necessarily have to relate to the user affirmatively causing or controlling plugin 124 as plugin 124 is configured for app instance 122 as described herein. Put differentially, controller 110 may be configured to merge plugin 124 with substantially any application, such that upon successful merger a user can use plugin 124 to manage UI navigation and acquire single-click navigation as described herein.

A request for application data is sent to the application (302). Controller 110 and/or plugin 124 may send the request. In some examples, the request may be sent to host server 130. Alternatively, or additionally, the request may be sent to app instance 122. The request may be sent to either host server 130 or app instance 122 depending upon whether the application is a web application (e.g., in response to which the request may be sent to host server 130) or a local copy of an application (e.g., in response to which the request may be sent to app instance 122). The request may be to see some or all source code of the application.

Application data may be received (304). The application data may be received by the entity that sent the request, whether controller 110 or plugin 124. As noted above, the application data may include some or all source code of the application.

Pages of the application may be identified (306). Controller 110 and/or plugin 124 may identify the pages. Controller 110 and/or plugin 124 may identify pages by techniques by identifying nodes of the UI framework of the application. For example, controller 110 and/or plugin 124 may identify all URLs within source code as unique pages of the application.

Controller 110 and/or plugin 124 may execute a trace operation on application (308). The trace operation may include functionality such as an HTTP Trace operation or the like. Controller 110 and/or plugin 124 may engage on this trace operation for a period of time that is sufficient to gather requests relating to substantially all pages of the application. In some examples, controller 110 and/or plugin 124 may itself generate requests for each identified page of the application. Controller 110 and/or plugin 124 may identify and gather each of these requests and responses as sent to and from and/or within app instance 124.

Input parameters for each page may be determined (310). Input parameters may include data that is required by the application in order to generate a respective page according to the code of the application. For example, if a page relates to metrics behind a sale opportunity, input parameters may include a price and an amount of a product to be sold. Some pages have many input parameters, and some pages may have substantially no input parameters. For example, some pages may be generated entirely from source code, such that a user needs to provide substantially no data for the application to generate those pages.

In certain examples, controller 110 and/or plugin 124 may additionally or alternatively determine pages of the application and/or determine parameters for each page by passively monitoring page requests sent by one or more users. For example, controller 110 and/or plugin 124 may monitor for a plurality of organically generated page requests from a plurality of user devices 120 that are all accessing separate respective app instances 122. In such examples, a plurality of user devices 120 may "opt-in" to sending their page requests to controller 110, and over a period of time controller 110 may identify substantially all pages and all page parameters by monitoring these organic page requests sent from respective app instances 122 to hosting servers 130.

Controller 110 and/or plugin 124 may identify all fully parameterized pages (312). Fully parameterized pages may include pages for which all respective input parameters are identified. This may include pages that do not have input parameters, as well as pages that require input parameters that have already been provided to application. As such, in some examples controller 110 and/or plugin 124 may have access to input parameters provided by the user to the app instance 122. For example, controller 110 and/or plugin 124 may identify input parameters as the input parameters are entered using a UI of app instance 122, and/or controller 110 and/or plugin 124 may identify input parameters from a memory store (e.g., within parameter data 286 of memory 280 of computing device 250) of user device 120 that app instance 122 is utilizing.

Once the fully parameterized pages are identified, plugin 124 may be fully "initialized" and ready for use by user, such that plugin 124 may execute a general ongoing monitor-and-response cycle. For example, plugin 124 may monitor for navigation requests from a user (314). Plugin 124 may receive these requests as a click via a plurality of mechanisms. For example, plugin 124 may receive a navigation request via a toggleable drop-down menu, or a pop-up menu. Alternatively, or additionally, plugin 124 may receive these requests as a click to "pin" (e.g., pseudo-permanently visually affix to UI of app instance 122) links to navigable pages.

In some examples, the manner in which single-click navigation is provided (e.g., visually generated within the UI) is application-specific, such that plugin 124 may identify a preferred manner of navigation and/or managing operations within the respective application, and then add in the single-click navigation functionality in a manner that is consistent this the application. Similarly, in some examples the application may explicitly specify a manner in which plugin 124 may provide functionality, and plugin 124 may therein integrate with app instance 122 accordingly.

Regardless as to how navigation requests are receiving, in response to plugin 124 receiving a navigation request, plugin 124 may generate hyperlinks or the like for each fully parameterized page (316). Users may click on these hyperlinks to navigate to the respective pages. Once navigated, plugin 124 may continue to monitor for further navigation requests (314)

In some examples, as described herein, plugin 124 may further identify one or more indeterminate pages that are not yet fully parameterized. In such examples, plugin 124 may provide a hyperlink to one or more proximate pages at which the user may fully parameterize the respective indeterminate page. For example, to continue the sale metric example above, the plugin 124 may identify that a sale metrics page is indeterminate, but may identify and provide a link to a sale entry page at which a user may provide a cost input parameter and/or a product amount input parameter, upon which the sale metric page may be fully parameterized.

Plugin 124 may further monitor whether or not parameter data has been updated (318). This may include monitoring actions within the UI to identify when a user transmits a new input parameter, and/or identifying when new input parameters are stored within memory of user device 120 that is allocated to the application as described above. Alternatively, or additionally, monitoring whether or not parameter data is updated may include identifying an application update that modifies the input parameters that are required for one or more pages, and/or adds or removes one or more pages from the application. In such cases, plugin 124 and/or controller 110 may request source code (304) again or execute a trace operation (308) again or the like to fully gather all page parameter information as described above. Following this, plugin 124 may identify fully parameterized pages (312) as described above.

Additionally, plugin 124 may monitor for close prompts (320). Close prompts may include prompts from a user to close plugin 124 and/or app instance 122. In response to any close prompts, plugin 124 may close plugin instance (322). Alternatively, plugin 124 may continue monitoring for navigation requests (314) as described herein when no close prompts are received.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, by a processor, application data of an application being utilized by a user, wherein the application data includes a plurality of pages of the application and wherein the application includes a set of input parameters used to generate data of pages of the plurality of pages;
determining, by the processor using the application data and for each respective page of the plurality of pages, a respective subset of input parameters that are required to generate that respective page, where each respective subset of input parameters is a smaller subset of the set of input parameters;
determining, by the processor, input parameters of the set of input parameters that are known, resulting in a subset of known input parameters;
identifying, by the processor and based on comparing respective subsets of input parameters and the subset of known input parameters, a set of pages of the plurality of pages that the processor has sufficient data to generate; and
generating, by the processor, a set of hyperlinks for the set of pages.

2. The method of claim 1, further comprising:
identifying, by the processor, an indeterminate page of the plurality of pages for which at least one input parameter is not known; and
determining, by the processor and in response to identifying the indeterminate page, a proximate page of the set of pages from which the user may navigate to the indeterminate page upon providing the at least one input parameter at the proximate page.

3. The method of claim 2, wherein generating the set of hyperlinks includes providing a hyperlink for the proximate page that navigates to the indeterminate page.

4. The method of claim 1, wherein the processor generates the set of hyperlinks as part of a plugin for an instance of the application as accessed by the user.

5. The method of claim 4, wherein the application is a first application, the application data is a first set of application data, the plurality of pages is a first plurality of pages, the set of input parameters are a first set of input parameters, and the set of pages are a first set of pages, the method further comprising:
   receiving, by the processor and using the plugin, a set of application data of a second application being utilized by the user, wherein the second set application data includes a second plurality of pages of the second application;
   determining, by the processor and using the plugin and the second set of application data, a second set of input parameters for each page of the second plurality of pages;
   determining, by the processor and using the plugin, a second set of pages of the second plurality of pages for which all respective input parameters are identified; and
   generating, by the processor and using the plugin, a second set of hyperlinks for the second set of pages of the second application.

6. The method of claim 1, further comprising
   detecting, by the processor, an update to the application data;
   determining, by the processor, updated input parameters for a page of the plurality of pages;
   determining, by the processor, an updated set of pages of the plurality of pages for which all respective updated input parameters are identified; and
   generating, by the processor, an updated set of hyperlinks for the updated set of pages.

7. The method of claim 1, wherein the plurality of pages includes at least one page that is not in the set of pages.

8. The method of claim 1, wherein the processor receives the application data using an HTTP trace operation.

9. The method of claim 1, wherein the processor generates the set of hyperlinks for the set of pages as a toggleable drop-down menu.

10. The method of claim 1, wherein:
    the plurality of pages define at least one predetermined sequence in which some of the plurality of pages are to be accessed; and
    the set of hyperlinks enables a user to skip at least one page of the predetermined sequence.

11. A system comprising:
    a processor; and
    a memory in communication with the processor, the memory containing instructions that, when executed by the processor, cause the processor to:
      receive application data of an application being utilized by a user, wherein the application data includes a plurality of pages of the application and wherein the application includes a set of input parameters used to generate data of pages of the plurality of pages;
      determine, using the application data and for each respective page of the plurality of pages, a respective subset of input parameters that are required to generate that respective page, where each respective subset of input parameters is smaller than the set of input parameters;
      determine input parameters of the set of input parameters that are known, resulting in a subset of known input parameters;
      identifying, based on comparing respective subsets of input parameters and the subset of known input parameters, a set of pages of the plurality of pages that the processor has sufficient data to generate; and
      generate a set of hyperlinks for the set of pages.

12. The system of claim 11, the memory further including instructions that, when executed by the processor, cause the processor to:
    identify an indeterminate page of the plurality of pages for which at least one input parameter is not known; and
    determine, in response to identifying the indeterminate page, a proximate page of the set of pages from which the user may navigate to the indeterminate page upon providing the at least one input parameter.

13. The system of claim 12, wherein generating the set of hyperlinks includes providing a hyperlink for that indeterminate page that navigates to the proximate page.

14. The system of claim 11, wherein the set of hyperlinks is generated as part of a plugin for an instance of the application as accessed by the user.

15. The system of claim 11, the memory further including instructions that, when executed by the processor, cause the processor to:
    detect an update to the application data;
    determine updated input parameters for each page of the plurality of pages;
    determine an updated set of pages of the plurality of pages for which all respective updated input parameters are identified; and
    generate an updated set of hyperlinks for the updated set of pages.

16. The system of claim 11, wherein the set of hyperlinks for the set of pages is generated as a toggleable drop-down menu.

17. A computer program product, the computer program product comprising a computer readable storage medium having program instructions embodied therewith, the program instructions executable by a computer to cause the computer to:
    receive application data of an application being utilized by a user, wherein the application data includes a plurality of pages of the application and wherein the application includes a set of input parameters used to generate data of pages of the plurality of pages;
    determine, using the application data and for each respective page of the plurality of pages, a respective subset of input parameters that are required to generate that respective page, where each respective subset of input parameters is smaller than the set of input parameters;
    determine input parameters of the set of input parameters that are known, resulting in a subset of known input parameters;
    identifying, based on comparing respective subsets of input parameters and the subset of known input parameters, a set of pages of the plurality of pages that the computer has sufficient data to generate; and
    generate a set of hyperlinks for the set of pages.

18. The computer program product of claim 17, the computer program product further including instructions that, when executed by the computer, cause the computer to:
    identify an indeterminate page of the plurality of pages for which at least one input parameter is not known; and
    determine, in response to identifying the indeterminate page, a proximate page of the set of pages from which the user may navigate to the indeterminate page upon providing the at least one input parameter.

19. The computer program product of claim 18, wherein generating the set of hyperlinks includes providing a hyperlink for that indeterminate page that navigates to the proximate page.

20. The computer program product of claim 17, the computer program product further including instructions that, when executed by the computer, cause the computer to:
   detect an update to the application data;
   determine updated input parameters for each page of the plurality of pages;
   determine an updated set of pages of the plurality of pages for which all respective updated input parameters are identified; and
   generate an updated set of hyperlinks for the updated set of pages.

* * * * *